UNITED STATES PATENT OFFICE.

PAYTON SPENCE, OF NEW YORK, N. Y.

COMPOUND FOR LAUNDRY BLUING.

SPECIFICATION forming part of Letters Patent No. 326,601, dated September 22, 1885.

Application filed July 28, 1884. (No specimens.)

*To all whom it may concern:*

Be it known that I, PAYTON SPENCE, of the city, county, and State of New York, have invented a new and useful Compound for Bluing; and I do hereby declare that the following is a full and exact description thereof.

The object of my invention is to produce, economically, a superior bluing compound for use in the laundry and for other purposes.

Both the indigo and the Prussian blue generally used as a bluing for bluing clothes in laundries have each a greenish tint, which is objectionable. Many of the aniline blues have a reddish tinge, which is also objectionable, and the blue-blue anilines are dull and dead in color from the absence of pink therein.

My invention consists in a combination of soluble Prussian blue (or insoluble Prussian blue rendered soluble by the common method of mixing it with oxalic acid in proportions varying from one-half to three pounds of the acid to one pound of the Prussian blue, preferably one pound of each) with soluble aniline blues of a reddish tint, known under the general trade name of "blue-reddish" (preference being given to that particular shade known to the trade as "R,") although all the shades of blue-reddish aniline are available, and are claimed, whereby the green hue of the Prussian blue and the reddish or purple hue of the aniline are masked or neutralized and the dullness of color removed, giving, as a result, a beautiful ultramarine blue, far superior as a laundry blue to either the Prussian blue or the aniline blues alone.

In carrying out my invention I take eight ounces of common commercial soluble Prussian blue and seven ounces of soluble aniline blue having a reddish tint, known to the trade as "blue reddish, R," and grind them together in a mill, thereby thoroughly admixing them in a dry state; or I dissolve the two together in water, preferably in hot water, stirring them until dissolved, and then evaporate the solution to dryness; or I dissolve them together in sufficient water to make a paste, which may be spread upon leaves of paper or cloth and dried thereon for use in the customary manner; or the two when dissolved in water may be bottled and kept for use or sale in liquid form. I do not, however, limit myself to the proportions of the ingredients herein given. In either case the compound is perfectly adapted for use in bluing clothes or in dyeing, and affords an ultramarine-blue color which because of its solubility and its ultramarine shade is superior to any of the bluings heretofore used for laundry purposes.

Having thus described my invention, what I desire to claim and secure as my invention is—

The within-described bluing compound, composed of soluble Prussian blue and soluble aniline blue-reddish, substantially as set forth.

In testimony whereof I have signed my name to this specification in the presence of two subscribing witnesses.

PAYTON SPENCE.

Witnesses:
 J. T. ACKER,
 A. B. MOORE.